United States Patent [19]

Schröder

[11] 4,308,775

[45] Jan. 5, 1982

[54] ARRANGEMENT FOR CONTROLLING THE ADVANCING DEVICE OF A MACHINE FOR REPETITIVE OPERATIONS

[75] Inventor: Norbert Schröder, Schopfheim, Fed. Rep. of Germany

[73] Assignee: Gerhard Kückels, Schopfheim, Fed. Rep. of Germany

[21] Appl. No.: 147,258

[22] Filed: May 5, 1980

[30] Foreign Application Priority Data

May 8, 1979 [DE] Fed. Rep. of Germany ....... 2918435

[51] Int. Cl.³ .............................................. B23D 36/00
[52] U.S. Cl. ....................................... 83/289; 83/295; 83/364
[58] Field of Search .................... 83/37, 286, 287, 288, 83/289, 290, 292, 293, 294, 295, 364

[56] References Cited

U.S. PATENT DOCUMENTS

| | | | |
|---|---|---|---|
| 2,149,430 | 3/1939 | Fleming | 83/292 |
| 3,293,968 | 12/1966 | Reilly | 83/295 |
| 3,299,757 | 1/1967 | Schumacher et al. | 83/293 |
| 3,717,058 | 2/1973 | McMinn | 83/292 X |

Primary Examiner—James M. Meister
Attorney, Agent, or Firm—Michael J. Striker

[57] ABSTRACT

An arrangement for controlling the advancing device of a machine for repetitive operations, especially for controlling the advancing speed of a slide carrying a cutting device of a cutting machine for cutting an elongated workpiece, such as a profile emanating at a predetermined speed from an extrusion press, a straightening machine or the like, into sections of uniform length. The arrangement performs the steps of preaccelerating the slide before a front end of the workpiece hits an abutment located on the slide in the path of the front end of the workpiece to a speed smaller than the speed at which the workpiece advances, and accelerating the speed of the slide to the speed of the workpiece upon engagement of the front end of the workpiece with the abutment, and subsequently thereto actuating the cutting device, whereby the impact force of the workpiece on the abutment is reduced, so that buckling of the workpiece upon impact on the abutment is prevented and the accuracy of the cutting operation is increased.

11 Claims, 6 Drawing Figures

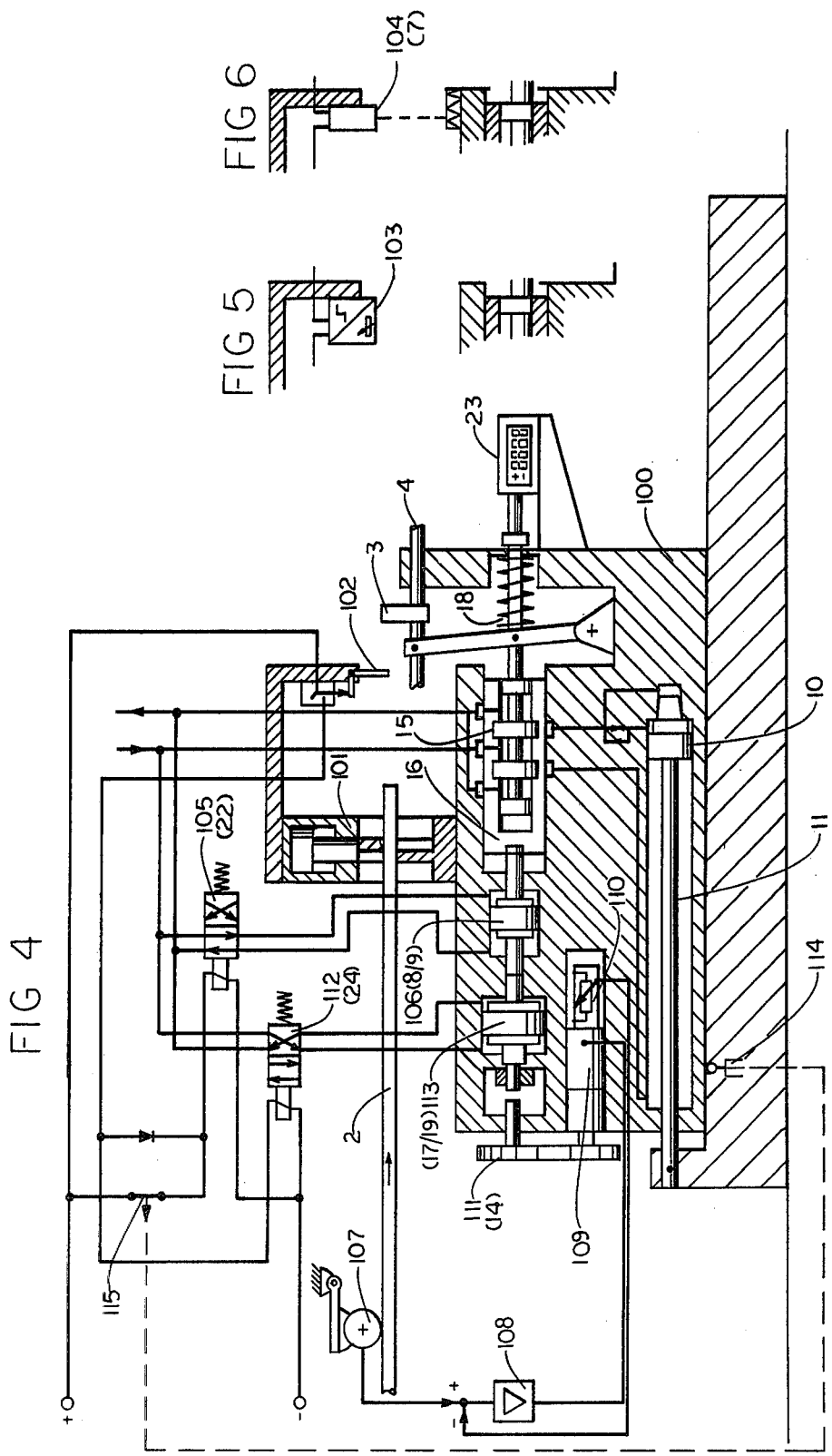

ARRANGEMENT FOR CONTROLLING THE ADVANCING DEVICE OF A MACHINE FOR REPETITIVE OPERATIONS

BACKGROUND OF THE INVENTION

The present invention relates to a method for controlling an advancing device on a machine for repetitive operations, especially for controlling the advancing speed of a slide carrying a cutting device of a cutting machine for cutting an elongated workpiece, such as a profile emanating at a predetermined speed from a profiling machine, an extrusion press, a straightening machine or the like, in sections of uniform length, in which the advancing workpiece hits an abutment, arranged on the slide in accordance with the length of the sections to which the elongated workpiece is to be cut, to thereby set the advancing device and subsequently thereto the cutting device or the like in motion. The present invention relates also to an arrangement for controlling such an advancing device and for carrying out the method.

Advancing devices are for instance known from the German Pat. No. 1,165,969, in which the drive of a separating slide or the like is controlled by means of an abutment, respectively a switching device, in such a manner that the slide is accelerated to the advancing speed of the workpiece for the separating operation. As drive for the slide may for instance serve a hydraulically operated cylinder and piston unit. The desired length of the sections to which the elongated workpiece is to be cut is adjusted with the mentioned abutment. When the workpiece hits the abutment a valve is operated over a linkage connected to the abutment for feeding pressure fluid into the cylinder and piston means forming the drive for the slide. In this known construction the workpiece actuates therefore the abutment and over the linkage connected thereto the valve member or control piston of the valve.

With increasing speed of the workpiece, which is desirable for increasing the output, the impining force of the workpiece against the abutment will increase, which will lead to a greater deflection of the abutment from its rest position. This known construction has, on the one hand, the disadvantage that thin and relatively weak profiles can be operated on only with a relative low speed, because otherwise they would buckle upon engagement with the abutment, which would detrimentally affect the exactness of the length of the sections to which the workpiece is to be cut. On the otherhand, by an increased deflection of the abutment at a higher speed of the workpiece the advancing device would be overcontrolled, if no corresponding provision on the regulating device would be provided, whereby again the exactness of the length of the sections to which a workpiece has to be cut would be reduced.

SUMMARY OF THE INVENTION

It is an object of the present invention to provide a method of the above-mentioned kind, in which also relative thin and weak elongated workpieces may be advanced at high speed to be cut in sections of predetermined length, while at the same time the exactness of the length of the cut sections for such thin, as well as for thicker workpieces is improved.

It is a further object of the present invention to provide a method in which the wear on the various elements of the apparatus for carrying out the method is reduced.

The above objects of the present invention are essentially obtained in that the advancing movement of the separating slide, or the like, is already started before the workpiece reaches the abutment and that thereby the speed of the separating slide, or the like, is preaccelerated to a speed which is smaller than the advancing speed of the workpiece and that the separating slide, or the like, is accelerated to the speed of the workpiece when the latter engages the abutment. In this way, it is possible to advance also workpieces with small bucking resistance at high speed since the speed at which the workpiece engages the abutment is reduced by the preacceleration of the slide. The impulse of the workpiece against the abutment is correspondingly reduced, so that the above-mentioned disadvantages are avoided. Upon engagement of the workpiece with the abutment, the slide is accelerated in the known manner to the advancing speed of the workpiece.

An especially advantageous method is obtained, if the preacceleration of the separating slide, or the like, is actuated by the movement of the workpiece. This may be obtained in various ways by feelers which engage, respectively cooperate with, the workpiece before the front end of the latter reaches the abutment.

The present invention relates also to an arrangement for carrying out the above-mentioned method, that is an arrangement for controlling the advancing speed of the separating slide. The arrangement is essentially characterized in that ahead of the abutment there is provided a switching device with a releasing element actuatable by the advancing workpiece and which controls the drive for the separating slide. As a releasing device of a first switch for the preacceleration of the slide, an electro-mechanical, an inductive or an optic-electronic contact, especially a so-called electric eye may be used. If the light ray emanating from the electric eye is interrupted by the front end of the advancing workpiece, the preacceleration of the slide may thus be started.

It is especially advantageous, when during preacceleration of the separating slide the flow of pressure fluid into the advancing cylinder for the slide is controlled in such a manner that the throughflow of the pressure fluid is smaller than during advancing of the slide at the speed of the workpiece. In this way all for the final advancing movement of the slide necessary parts are already set in motion, so that only smaller additional acceleration forces are necessary when the workpiece reaches the abutment. A constructive simple and therefore especially advantageous construction is obtained if, for the preacceleration a preaccelerating cylinder with a control piston is provided which engages the valve member of a main valve arranged in the hydraulic circuit of the advancing cylinder of the separating slide. The preacceleration can thus be obtained by actuating the preacceleration cylinder, the piston of which opens already the main valve to a certain degree so that the operating cylinder of the separating slide is already supplied with pressure fluid without, however, accelerating the slide already to the speed of the advancing workpiece.

The novel features which are considered as characteristic for the invention are set forth in particular in the appended claims. The invention itself, however, both as to its construction and its method of operation, together with additional objects and advantages thereof, will be best understood from the following description of spe-

BRIEF DESCRIPTION OF THE DRAWING

FIG. 4 is a cross-section of a cutting-slide with control means;

FIG. 5 shows a section of the cutting-slide, particularly another type of a switching device with an inductive contact; and FIG. 6 is an arrangement similar to that shown in FIG. 5 in which the switching device is in the form of an optical-electronic contact.

DESCRIPTION OF THE PREFERRED EMBODIMENTS

Figure 1:
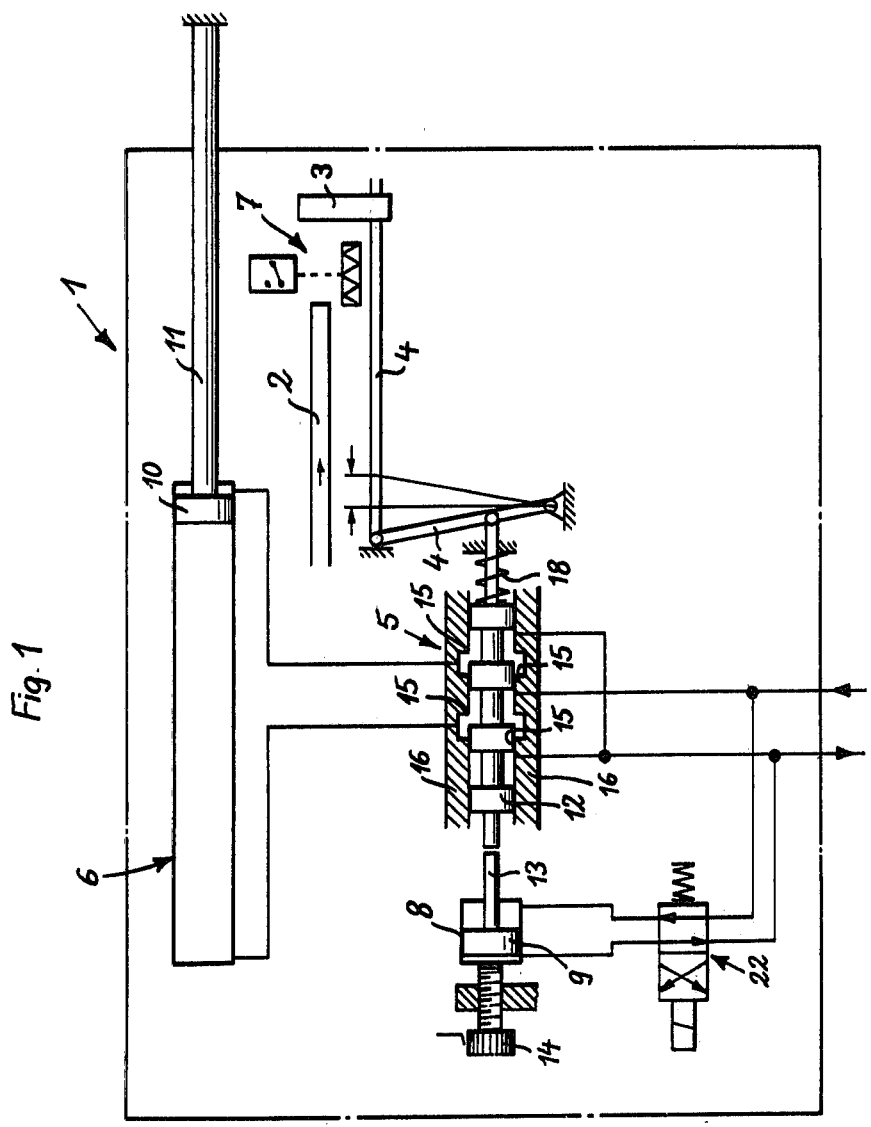
FIG. 1 schematically illustrates the arrangement of the present invention, including an advancing cylinder for the advancing device of the separating slide with an abutment, connected by a linkage to a main valve in a hydraulic circuit supplying the advancing cylinder with pressure fluid and an additional preaccelerating cylinder actuatable by an electronic eye and acting on the valve member of the main valve.

In all three embodiments (FIGS. 1 to 3) the reference numeral 1 designates an advancing device, indicated by the dash-dot outline, which serves especially for actuating of a non-illustrated separating slide of a separating machine for cutting the movable workpiece 2 to length and moving with the advancing device. The workpiece 2 may be constituted by an elongated profile emanating from a profiling machine, an extrusion press, a straightening machine or the like and advancing at a predetermined speed to be operated on, especially severed in sections of predetermined lengths, during its movement. For this purpose there is provided an abutment 3 on the slide adjustable with respect to the non-illustrated cutting machine according to the length of the sections to which the elongated workpiece has to be cut. If the front end of the elongated workpiece 2 impinges on the abutment 3, a main valve 5 is actuated by means of a linkage 4 between the abutment 3 and the valve member 12 of the main valve so that the advancing cylinder 6 is supplied with pressure fluid and the therewith connected separating slide set in motion.

According to the present invention there is provided upstream of the abutment 3, as considered in the direction of movement of the workpiece 2, a switching device with a releasing element, which initiates the drive of the separating slide in the manner as will be described later on. The releasing device may be in the form of an electromechanical (FIG. 4), an inductive (FIG. 5), or optic-electronic (FIG. 6) contact, eventually also in the form of a measuring wheel engaging the advancing profile 2. The releasing device is illustrated in the drawing (FIGS. 1 to 3) in the form of a so-called electric eye 7, which, in the manner as will be described, already sets the advancing cylinder 6 in motion before the front end of the advancing workpiece 2 engages the abutment 3. Thereby, the separating slide and the abutment 3 mounted thereon will be already set in motion before the front end of the advancing workpiece 2 engages the abutment 3, so that the relative speed of the advancing workpiece 2 with respect to the abutment 3 is reduced during engagement of the workpiece with the abutment. The reaction forces between the advancing workpiece and the abutment 3 are thereby reduced. In order to obtain the preacceleration, the advancing cylinder 6 of the separating slide, respectively the advancing device 1, is impinged by the pressure fluid, whereby, however, the through-flow of the pressure fluid is smaller than during operation of the slide with the speed of the advancing workpiece, which will be obtained when the workpiece 2 engages the abutment 3.

In order to obtain the preacceleration of the slide there is provided in all three embodiments of the present invention a preaccelerating cylinder 8 with a control piston 9, which is arranged for cooperation with the main valve 5 in the hydraulic pressure fluid circuit supplying the advancing cylinder 6 of the separating slide with pressure fluid.

In all three illustrated embodiments the piston 10 of the advancing cylinder 6 and the piston rod 11 are stationarily arranged, whereas the cylinder 6 is connected to the slide, respectively the advancing mechanism for moving the latter.

The piston rod 13 projecting beyond the preacceleration cylinder 8 toward the valve member 12 of the main valve 5 is, in the embodiment shown in FIG. 1, not connected to the valve member, but only adapted to abut against the same during advance of the piston rod 13 toward the right, as viewed in the drawing, so that the piston 9 of the preaccelerating cylinder 8 will only act during its movement toward the right on the valve member 12 of the main valve 5, but will remain inactive during the movement of the piston 9 in the opposite direction so that the piston 9 will actuate the main valve 5 for actuating the advancing cylinder 6, while the piston 9 will not prevent resetting of the main valve for the return movement of the advancing device 1.

When the front end of the advancing workpiece 2 passes the electric eye 7 and interrupts the light ray emanating therefrom, the solenoid operated auxiliary valve 22 connected by an electric circuit, not shown in the drawing, with the electric eye 7 is operated, to move from the position shown in FIG. 1 towards the right, so that pressure fluid is fed into the cylinder 8 to the left side of the piston 9 therein, while pressure fluid is discharged from the other side of the piston, so that the latter and the piston rod 13 connected thereto moves toward the right, as viewed in FIG. 1, to move the valve member 12 of the main valve 5 also towards the right. Thereby, the main valve 5 will be opened to a certain extent to preaccelerate the advancing cylinder 6. As shown in FIG. 1 an adjusting screw 14 is connected to the preaccelerating cylinder 8 for adjusting the position of the latter in axial direction for the adjustment of the preacceleration. If the position of the cylinder 8 is changed by means of the adjusting screw 14, there will result a correspondingly changed effective stroke of the piston 9, which will lead to a greater or smaller movement of the valve member 12 of the main valve 5, which will result in a corresponding adjustment of the preacceleration.

When, after the advancing mechanism 1 or the slide is thus preaccelerated to a speed smaller than the advancing speed of the workpiece 2, the latter hits the abutment 3 and displaces the latter, the valve member 12 of the main valve 5 is moved against the pressure of the spring 18 further toward the right, as viewed in FIG. 1, the main valve will be fully opened and pressure fluid will be fed into the compartment of the advancing cylinder 6 to the right side of the piston 10 therein so that the advancing device, respectively the slide, will be accelerated to the advancing speed of the workpiece 2, whereafter the non-illustrated cutting mechanism on the slide is operated to cut the workpiece.

Figure 2:
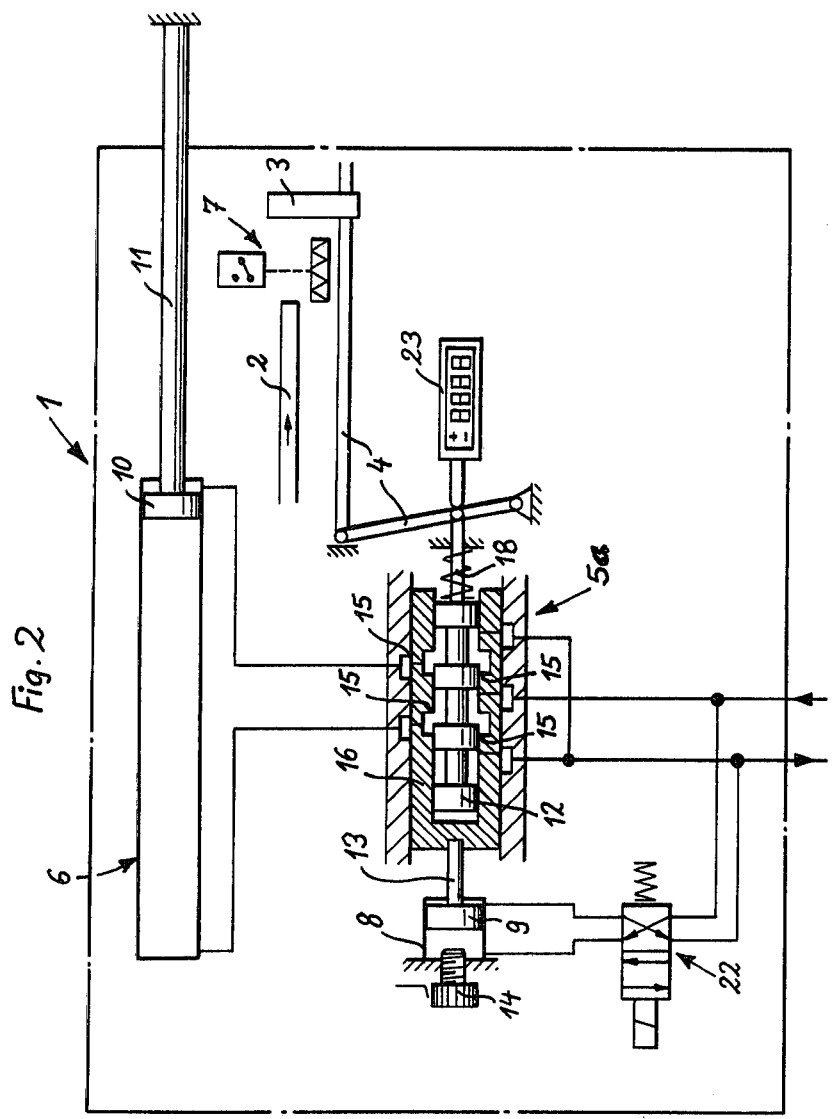
FIG. 2 is an arrangement similar to that shown in FIG. 1 in which the main valve includes a sleeve reciprocably arranged in the housing of the main valve and in which the valve member of the main valve is reciprocable in the sleeve for controlling flow of pressure fluid to the operating cylinder and in which the preaccelerating cylinder cooperates with the sleeve of the main valve for moving the latter.
Figure 3:
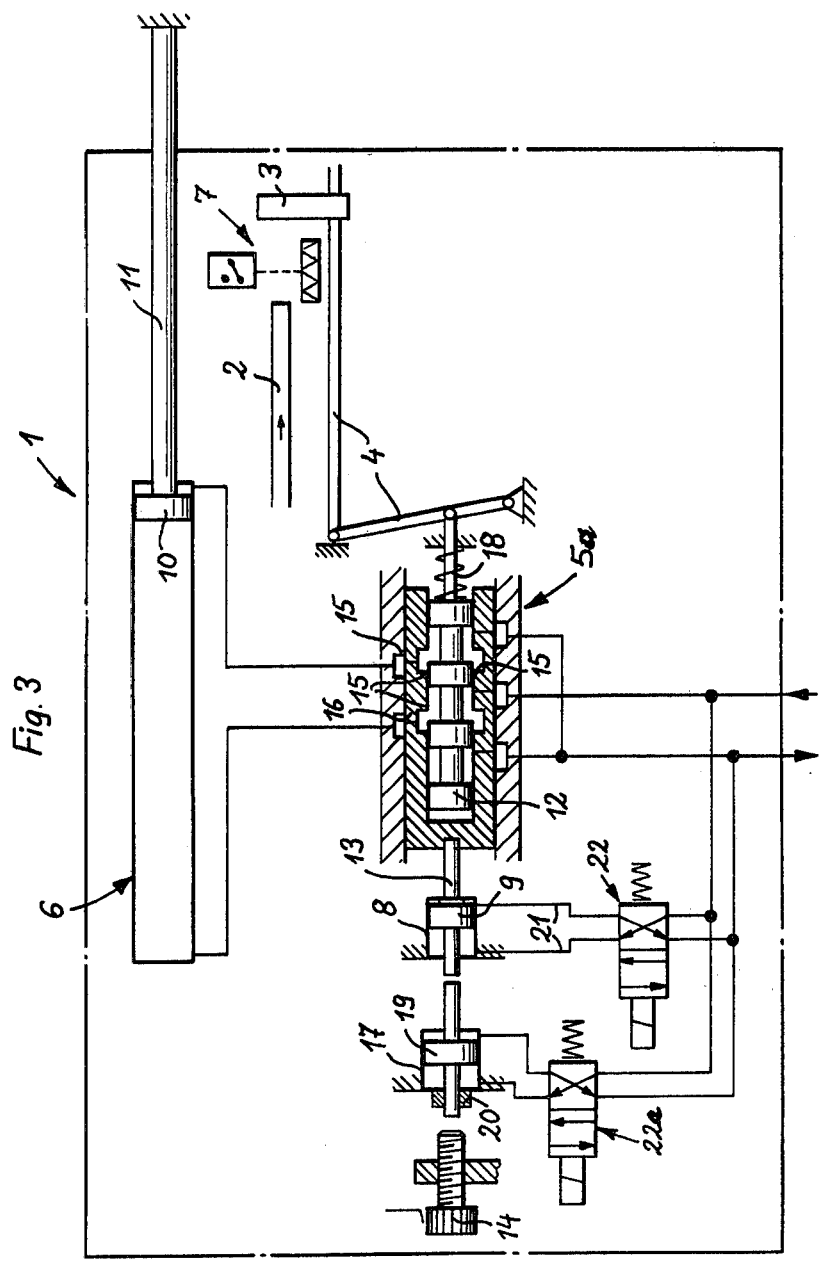
FIG. 3 illustrates an arrangement similar to that shown in FIG. 2 in which a braking cylinder for damping the return movement of the separating slide is provided.

The main valve 5a of the embodiments illustrated in FIGS. 2 and 3 differs from the main valve of the embodiment shown in FIG. 1 in that the main valve 5a includes a control sleeve 16 provided with control edges 15 reciprocatably arranged in the housing of the main valve, whereas the control piston or valve member 12 of the main valve 5a is reciprocatably arranged in the aforementioned sleeve to cooperate during its movement relative thereto with the control edges of the latter. In these embodiments the piston rod 13 of the piston 9 in the preaccelerating cylinder 8 is connected to the sleeve 16 for movement therewith, whereas the linkage 4 connects the abutment 3, as in the embodiment shown in FIG. 1, to the valve member 12 of the main valve 5a. When the front end of the workpiece 2 interrupts the light ray emanating from the electric eye 7, the solenoid operated auxiliary valve 22 connected in circuit with the electric eye 7 will be actuated and moved from the position as shown in FIGS. 2 and 3 toward the right, so that pressure fluid is now fed to the right side of the piston 9 in the accelerating cylinder 8 to move the piston 9, the piston rod 13 and the sleeve 16 of the main valve 5a towards the left, whereby the main valve 5a is opened to a certain degree. Thereby, the control piston or valve member 12 of the main valve 5a and the linkage 4 remain at first in stationary position so that this arrangement is of special importance. This arrangement has the advantage that the linkage 4 with the abutment 3 is at first not actuated, so that a speed error typical for proportionate position actions of these elements may be may be eliminated by a single adjustment if the screw 14 extending into the preacceleration cylinder 8 is adjusted in such a manner that the differential speed between the advancing speed of the workpiece 2 and the preaccelerating speed remains always the same. The speed to be obtained during the preacceleration is thus influenced by the movement of the sleeve 16 and the control piston 12 relative to each other. At a constant preselection of the speed difference at the adjusting screw 14, the control deviation typical for a proportional controller in the form of an abutment deviation remains therefore constant so that the above-described elimination may be carried out by a corresponding adjustment of the abutment screw. This elimination of the control deviation constitutes an essential simplification of the operability of the arrangement according to the present invention. It permits in addition blocking of a portion of the deflection of the abutment by the advancing workpiece 2 and therewith a partial mechanical movement of the advancing device by the workpiece, whereby still better tolerances in cutting the workpiece are obtained.

The arrangement illustrated in FIG. 3 differs from the previously described arrangement illustrated in FIG. 2 in that an additional braking cylinder 17 aligned along a common axis with the preaccelerating cylinder 8, is provided for braking the return movement of the separating slide before the latter reaches its rear end position and the braking cylinder 17 is arranged in order to limit the return movement of the control piston 9 in the preaccelerating cylinder 8. During return movement of the separating slide, the piston 9 in the preaccelerating cylinder 8 and therewith the sleeve 16 are moved toward the right, as viewed in FIG. 3, whereas the valve member or control piston 12 of the main valve 5a is pressed by the spring 18 towards the left, so that the control edges 15 on the sleeve 16 and the housing of the main valve 5 will pass a large amount of pressure fluid for the return movement into the cylinder 6. Before the separating slide reaches now its rear end position, the piston 9 in the preaccelerating cylinder 8 will be pressed against the control piston 19 of the braking cylinder 17, now moved towards the right. Thereby, the flow-through cross-section at the control edges 15 of the main valve 5a will be reduced so that the return movement will be delayed, respectively braked. The arrangement of the braking cylinder 17 provides therefore a construction which is possible in connection with a main valve having a sleeve 16, the movement of which is controlled by the piston in a preaccelerating cylinder. The braking action during the return movement may be adjusted by means of an adjusting nut 20 or the like connected to the piston 19 of the braking cylinder 17. By adjusting the position of the adjusting nut 20 on the piston rod of the piston 19, the force of the braking action may be adjusted.

In all three embodiments according to the present invention the preaccelerating cylinder 8 and in the embodiment shown in FIG. 3 also the braking cylinder 17 is connected over branch conduits 21 and the auxiliary valves 22 respectively 22a with the main circuit of hydraulic pressure fluid upstream of the connection of the latter to the main valve means 5 or 5a. Accordingly, the cylinders 8 and 17 may also be provided with pressure fluid from a non-illustrated pump of the machine, feeding such pressure fluid into the pressure fluid circuit.

A further advantageous development according to the present invention is indicated in FIG. 2. In this construction the valve member 12 of the main valve 5a is connected to a measuring instrument 23 indicating the movement of the valve member 12. The scale of this measuring instrument 23 is preferably so adjusted that it indicates zero when the valve member 12 carries out a constant stroke. If the measuring instrument indicates a number different from zero it indicates therefore a control deviation which may be compensated by adjusting the adjusting screw 14 influencing the preacceleration, whereby the tolerances at which the workpiece 2 is cut may be further improved.

There exists also the possibility that the abutment 14, which is preferably in form of an abutment screw, may be automatically adjusted by an instrument, for instance a tachometer 107, engaging the advancing workpiece 2 and measuring the advancing speed of the latter. The measuring instrument 23, as well as a measuring instrument measuring the speed of the advancing workpiece may be connected to an automatic control system 108 for regulating the position of the abutment screw, so that especially a control deviation indicated by the measuring instrument 23 may be automatically compensated. (FIGS. 2 and 4).

With the arrangement according to the present invention it is therefore possible to cut also thin profiles at a high working speed into sections of predetermined length, since the advancing movement of the separating slide is already started before the workpiece reaches the abutment 3, whereby the separating slide is preaccelerated to a speed which is smaller than that of the advancing workpiece 2. When the workpiece 2 reaches the abutment 3 it is then only necessary to accelerate the separating slide to the speed of the workpiece, whereby this remaining acceleration is, of course, smaller since only the differential speed between the workpiece 2 and the preaccelerated abutment 3 exists. Correspondingly, smaller reaction forces will occur between the workpiece 2 and the abutment 3.

FIG. 4 shows the cutting-slide 100 with the cutting device 101. By means of the electro-mechanical switch 103 or the light barrier 104, the hydraulic valve 105 and thus the preaccelerating cylinder 106 are set in motion in the manner described above (namely to the left), as soon as the material to be cut touches the switch. At the same time the hydraulic valve 112 and the brake cylinder 113 are set in motion (also to the left) and pressed against the adjusting screw 111. The advancing speed is measured at the work-piece with the measuring device 107. The control amplifier 108 steers the adjusting drive (actuator) 109 with position feed-back 110, so that a speed-dependent regulation of the advancing speed can be attained in the desired manner by means of the adjusting screw 111. As soon as the work-piece has been separated and expelled switch 102, 103 or 104 becomes free, the valves 105 and 112 fall away and both pistons move to the right. Shortly before end of the return movement the slide 100 runs over the cam 114 and activates the electrical contact 115. As a result the hydraulic valve 105 is reactivated. The smaller piston 106 moves to the left against the larger piston 113 which has been pressed to the right, by means of which the return movement is subdued in the end phase.

It will be understood that each of the elements described above, or two or more together, may also find a useful application in other types of arrangements for controlling the advancing device of a machine for repetitive operation differing from the types described above.

While the invention has been illustrated and described as embodied in an arrangement for controlling the advancing device of a machine for repetitive operations, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for controlling an advancing device of a machine for repetitive operations, especially for controlling movement of a slide carrying a cutting device of a cutting machine for cutting an elongated workpiece such as a profile emanating at a predetermined speed from a profiling machine, an extrusion press, a straightening machine or the like into sections of uniform length, a combination comprising means for moving the slide in the direction of the moving workpiece and comprising fluid-operated means including a cylinder member and a piston member reciprocatably arranged in said cylinder member and dividing the latter in two compartments, one of said members being stationary and the other fixed to the slide; a circuit for hydraulic pressure fluid; main valve means in said hydraulic pressure fluid circuit for controlling flow of pressure fluid into and out of the respective compartments; an abutment on the slide located in the path of the front end of the advancing workpiece; switch means on the slide upstream of said abutment, as considered in the direction of the moving workpiece, to be actuated as the front end of the workpiece passes said switch means; means in circuit with said switch means and cooperating with said moving means for preaccelerating said slide upon actuating said switch means to a speed smaller than the predetermined speed and comprising auxiliary valve means controlled by said switch means and preaccelerating cylinder and piston means controlled by said auxiliary valve means and cooperating with said main valve means for controlling flow of pressure fluid into and out of the compartments to thus preaccelerate the slide to a speed smaller than said predetermined speed; and means operatively connected to said abutment and said main valve means for controlling flow of pressure fluid into and out of the compartments in such a manner that upon an engagement of the front end of the workpiece with said abutment said slide is accelerated to said predetermined speed.

2. A combination as defined in claim 1, wherein said main valve means comprises a valve housing and a valve member movable in said valve housing for controlling flow of pressure fluid passing through said main valve means, and wherein said preaccelerating cylinder and piston means comprises a cylinder, a piston reciprocatable in said cylinder and having a piston rod adapted during movement of piston in one direction to move said valve member of said main valve means in a corresponding direction while not acting on said valve member during movement of said piston in the opposite direction.

3. A combination as defined in claim 1, wherein said main valve means comprises a valve housing, a sleeve provided with control edges reciprocably arranged in said valve housing and a valve member reciprocatably arranged in said sleeve and cooperating with said control edges for controlling flow of pressure fluid through said main valve means, wherein said preaccelerating cylinder and piston means comprises a cylinder, a piston reciprocable in said cylinder between a forward and a return stroke and having a piston rod connected to said sleeve for moving the latter during reciprocation of said piston, and including linkage means connecting said abutment with said valve member.

4. A combination as defined in claim 2, and including an adjusting screw connected to said cylinder for adjusting the position of the latter and therewith adjusting the preacceleration.

5. A combination as defined in claim 3, and including an adjusting screw extending in said cylinder for adjusting the active stroke of said piston therein to thereby adjust the preacceleration.

6. A combination as defined in claim 3, wherein said moving means moves said slide between a rear end position and a forward end position, and including brake cylinder and piston means for braking movement of said slide from said forward to said rear end position, and brake cylinder and piston means being arranged and constructed for limiting the rearward stroke of the piston of said preaccelerating cylinder and piston means.

7. A combination as defined in claim 6, and including means for adjusting the stroke of the piston of said brake cylinder and piston means for adjusting braking of the movement of said slide toward the rear end position.

8. A combination as defined in claim 1, and including a branch circuit branching off from said circuit of hydraulic pressure fluid upstream of the connection of the latter to said main valve means for providing said auxiliary valve means with pressure fluid.

9. A combination as defined in claim 6, and including an additional auxiliary valve means for controlling said brake cylinder and piston means, said first mentioned auxiliary valve means and said additionally auxiliary valve means being connected to a branch circuit branching off from said circuit of hydraulic pressure fluid upstream of the connection of the latter to said main valve means.

10. A combination as defined in claim 2, and including a measuring instrument cooperating with said valve member for indicating the maximum deflection of the latter relative to the remainder of said main valve means.

11. A combination as defined in claim 10, wherein said measuring instrument has a scale which is adjusted in such a manner to indicate zero when said deflection is a predetermined constant deflection.

* * * * *